(12) United States Patent
Hashimoto

(10) Patent No.: US 9,229,195 B2
(45) Date of Patent: Jan. 5, 2016

(54) IMAGING LENS

(71) Applicant: KANTATSU CO., LTD., Yaita-shi, Tochigi (JP)

(72) Inventor: Masaya Hashimoto, Sukagawa (JP)

(73) Assignee: KANTATSU CO., LTD., Yaita-shi (JP)

( * ) Notice: Subject to any disclaimer, the term of this patent is extended or adjusted under 35 U.S.C. 154(b) by 0 days.

(21) Appl. No.: 14/242,967

(22) Filed: Apr. 2, 2014

(65) Prior Publication Data

US 2014/0313596 A1     Oct. 23, 2014

(30) Foreign Application Priority Data

Apr. 22, 2013     (JP) ................................ 2013-089041

(51) Int. Cl.
 *G02B 3/02*     (2006.01)
 *G02B 13/00*     (2006.01)
 *G02B 13/06*     (2006.01)

(52) U.S. Cl.
 CPC ............ *G02B 13/0045* (2013.01); *G02B 13/06* (2013.01)

(58) Field of Classification Search
 CPC .............................. G02B 13/0045; G02B 9/60
 USPC ......................................................... 359/714
 See application file for complete search history.

(56) References Cited

U.S. PATENT DOCUMENTS

2012/0019706 A1     1/2012   Yamashita et al.
2013/0265651 A1*   10/2013   Ishizaka ........................ 359/714
2014/0293447 A1*   10/2014   Noda et al. .................... 359/714

FOREIGN PATENT DOCUMENTS

| JP | 2009-75141 A | 4/2009 |
| JP | 2010-26434 A | 2/2010 |
| JP | 2010-48996 A | 3/2010 |
| JP | 2010-271541 A | 12/2010 |

* cited by examiner

*Primary Examiner* — James Jones
(74) *Attorney, Agent, or Firm* — Westerman, Hattori, Daniels & Adrian, LLP

(57) ABSTRACT

A low-cost, compact and low-profile imaging lens with relatively high brightness, which provides a wide field of view (full field of view: about 90 degrees) and corrects aberrations properly. Designed for a solid-state image sensor, it includes elements arranged in the following order from an object side to an image side: an aperture stop, a first positive (refractive power) lens, a second negative lens having a concave image-side surface, a third positive lens having a convex image-side surface, a fourth lens as a meniscus double-sided aspheric lens having a convex object-side surface near an optical axis, a fifth negative lens as a double-sided aspheric lens having a concave image-side surface near the optical axis, and a conditional expression (1) below is satisfied:

$$|r1| > |r2| \qquad (1)$$

where
 r1: curvature radius of the object-side surface of the first lens
 r2: curvature radius of the image-side surface of the first lens.

20 Claims, 10 Drawing Sheets

IMAGING LENS

The present application is based on and claims priority of Japanese patent application No. 2013-089041 filed on Apr. 22, 2013, the entire contents of which are hereby incorporated by reference.

BACKGROUND OF THE INVENTION

1. Field of the Invention

The present invention relates to imaging lenses which form an image of an object on a solid-state image sensor such as a CCD sensor or a C-MOS sensor used in a compact image pickup device and more particularly to imaging lenses which are built in image pickup devices mounted in increasingly compact and low-profile mobile terminals such as smart phones, mobile phones and PDAs (Personal Digital Assistants), and game consoles and information terminals such as PCs.

2. Description of the Related Art

In recent years, there has been a tendency that image pickup devices mounted in mobile terminals such as smart phones provide high resolution to cope with an increase in the number of pixels. Also, the imaging lenses built in these image pickup devices are required to provide high resolution, compactness, low-profileness (thinness) and high brightness. In addition, wide-angle cameras capable of capturing an image of an object in a wide range are expected to be used in a wider range of application fields than before. For example, the need for compact monitoring cameras and security cameras has been increasing, and recently robot vacuum cleaners in which a camera controllable remotely by a smart phone is mounted and eyeglass type head-mounted displays with cameras have been developed, rapidly. The imaging lenses of the image pickup devices mounted in these products are strongly expected to provide not only high performance and compactness but also a wider field of view or wider viewing angle than the conventional imaging lenses.

However, if the photographic field of view is particularly widened, a problem may arise that correction of aberrations on the peripheral portion is very difficult and high optical performance is not ensured. Therefore, it is difficult to realize an imaging lens which meets the needs for high resolution, compactness, and low-profileness and also the demand for a wider field of view.

The imaging lenses described in the following Patent Documents 1 to 3 are known as imaging lenses intended to meet the needs for a wider field of view and higher performance.

JP-A-2009-075141 (Patent Document 1) discloses an imaging lens in which elements are arranged in the following order from an object side: a negative first lens having a concave surface on an image side; a positive second lens having a convex surface on the image side; an aperture stop; a third lens as a plano-convex lens having a flat surface on the object side or a biconvex lens having a surface with a large absolute value of curvature radius on the object side; and a cemented lens with positive composite refractive power, composed of a fourth lens and a fifth lens.

JP-A-2010-271541 (Patent Document 2) discloses an imaging lens in which elements are arranged in the following order from an object side to an image side: a first lens as a biconvex lens with positive refractive power; a second lens with negative refractive power having a concave surface on the image side; a third lens as a meniscus lens with positive refractive power having a convex surface on the image side; and a fourth lens as a double-sided aspheric lens with negative refractive power having a concave surface on the image side near an optical axis.

JP-A-2010-026434 (Patent Document 3) discloses an imaging lens intended to be compact and correct various aberrations properly, in which elements are arranged in the following order from an object side: a positive first lens, a positive second lens, a negative third lens, a positive fourth lens, and a negative fifth lens.

The imaging lens described in Patent Document 1 provides high brightness with an F-value of 2.0 and also achieves a wide field of view of about 90 degrees through its first lens with negative refractive power. However, its total track length is about 18 mm, so it cannot meet the needs for compactness and low-profileness. Furthermore, since all the lens surfaces are spherical, it is difficult to correct aberrations and achieve high imaging performance. In fact, the disclosed aberration diagrams indicate that spherical aberrations are serious. Furthermore, since all the lenses are made of glass material, it is difficult to reduce cost.

The imaging lens described in Patent Document 2 has a total track length of about 5.4 mm and the ratio of the total track length to the diagonal length of the effective imaging plane of the image sensor is about 0.9. This suggests that the imaging lens is relatively low-profile. Also, the maximum field of view is in the range from about 70 degrees to 75 degrees, so it provides a relatively wide field of view but it cannot meet the recent demand for a wider field of view. In addition, its F-value is about 2.8, so it cannot be said to provide sufficient brightness to cope with a compact, high-pixel image sensor.

The imaging lens described in Patent Document 3 provides high brightness with an F-value of 2.0 to 2.5 or so and has an ability to correct various aberrations properly. Since it is composed of five constituent lenses, it is advantageous in correcting various aberrations but disadvantageous in terms of compactness and low-profileness. Its total track length is as long as about 7.8 mm and the ratio of total track length to maximum image height is about 1.1. The maximum field of view is about 62 degrees. Therefore, the imaging lens described in Patent Document 3 also does not meet all the above recent needs.

As mentioned above, in the related art, it is difficult to provide the required high resolution, compactness and low-profileness and also meet the demand for a wide field of view.

SUMMARY OF THE INVENTION

The present invention has been made in view of the above problem and an object thereof is to provide a low-cost, compact and low-profile imaging lens with relatively high brightness, which provides a wide field of view (maximum field of view: about 90 degrees) and corrects various aberrations properly though it is composed of five constituent lenses.

The term "low-profile" here implies that the total track length is shorter than the diagonal length of the effective imaging plane of the image sensor, and a "wide field of view" here is equivalent to a full field of view of 90 degrees or so.

According to one aspect of the present invention, there is provided an imaging lens for a solid-state image sensor in which elements are arranged in the following order from an object side to an image side: an aperture stop, a first lens with positive refractive power, a second lens with negative refractive power having a concave surface on the image side, a third lens with positive refractive power having a convex surface on the image side, a fourth lens as a meniscus double-sided aspheric lens having a convex surface on the object side near an optical axis, and a fifth lens as a double-sided aspheric lens with negative refractive power having a concave surface on the image side near the optical axis. The imaging lens satisfies a conditional expression (1) below:

$$|r1|>|r2| \qquad (1)$$

where r1: curvature radius of the object-side surface of the first lens r2: curvature radius of the image-side surface of the first lens.

The above imaging lens includes a lens group with positive composite refractive power, composed of the positive first lens, the negative second lens, and the positive third lens, and a lens group with negative composite refractive power, composed of the fourth lens and the fifth lens, so it is easy to shorten the total track length.

In the first lens, the curvature radius of the object-side surface is larger than the curvature radius of the image-side surface so that a wide field of view which the conventional imaging lenses could not offer is achieved. Specifically, when the conditional expression (1) is satisfied, the wide field of view can be adequately achieved. Generally, when the field of view is wider, it is more difficult to correct various aberrations on the lens peripheral portion. Spherical aberrations of the first lens can be reduced to a certain extent by adequate aspheric surfaces formed on the first lens. However, when a wide field of view as intended by the present invention is provided, spherical aberrations cannot be corrected properly only by the aspheric surfaces of the first lens. Therefore, lenses located on the image side of the first lens take responsibility for correction of residual spherical aberrations. In the present invention, particularly by the aspheric surfaces of the fourth lens, the imaging lens can provide both a wide field of view and practicable high performance.

The second lens is a lens with negative refractive power having a concave surface on the image side and is mainly responsible for proper correction of spherical aberrations, axial chromatic aberrations and chromatic aberrations of magnification of the first lens.

The third lens is a lens with positive refractive power having a convex surface on the image side, which corrects astigmatism and field curvature.

The fourth lens is a meniscus lens having a convex surface on the object side near the optical axis, in which the object-side surface and the image-side surface have adequate aspheric shapes to prevent an increase in spherical aberrations, field curvature and distortion which may occur due to a widened field of view. Since the fourth lens is primarily intended to correct aberrations, its refractive power is the weakest among the five constituent lenses, and the change in thickness and the change in the amount of aspheric surface sag are small within the effective diameter ranging from the lens center to the peripheral portion.

The fifth lens is a lens with negative refractive power having a concave surface on the image side, in which the object-side surface and the image-side surface have adequate aspheric shapes to control the angle of light rays incident on the image sensor.

Preferably, the imaging lens according to the present invention satisfies a conditional expression (2) below:

$$0.9<ih/f<1.1 \qquad (2)$$

where f: focal length of the overall optical system of the imaging lens ih: maximum image height.

The conditional expression (2) defines an adequate range for the ratio of the maximum image height to the focal length of the overall optical system of the imaging lens, and indicates a condition to provide a wide field of view, high brightness with an F-value of 2.8 or less and high imaging performance. If the value is below the lower limit of the conditional expression (2), the focal length of the overall optical system of the imaging lens would be too long with respect to the maximum image height, making it difficult to widen the field of view. On the other hand, if the value is above the upper limit of the conditional expression (2), the focal length of the overall optical system of the imaging lens would be too short with respect to the maximum image height and it would be difficult to correct aberrations on the peripheral portion properly, leading to deterioration in optical performance, though it would be easier to provide a wide field of view, compactness, and low-profileness.

Preferably, the imaging lens according to the present invention satisfies a conditional expression (3) below:

$$2.20<|r1/r2|<8.20 \qquad (3)$$

where r1: curvature radius of the object-side surface of the first lens r2: curvature radius of the image-side surface of the first lens.

The conditional expression (3) defines an adequate range for the paraxial surface shapes of the first lens. If the value is above the upper limit of the conditional expression (3), spherical aberrations of the first lens would tend to increase and the total track length would also tend to increase. On the other hand, if the value is below the lower limit of the conditional expression (3), spherical aberrations of the first lens would tend to decrease and the total track length would also tend to decrease but astigmatism would tend to worsen. When the conditional expression (3) is satisfied, the amount of aberrations of the first lens due to the widened field of view can be reduced.

Preferably, the imaging lens according to the present invention satisfies a conditional expression (4) below:

$$-1.50<f2/f<-1.00 \qquad (4)$$

where f: focal length of the overall optical system of the imaging lens f2: focal length of the second lens.

The conditional expression (4) defines an adequate range for the negative refractive power of the second lens with respect to the refractive power of the overall optical system of the imaging lens, and indicates a condition to correct chromatic aberrations properly. If the value is below the lower limit of the conditional expression (4), the negative refractive power of the second lens would be too weak, making it difficult to correct chromatic aberrations. On the other hand, if the value is above the upper limit of the conditional expression (4), the negative refractive power of the second lens would be too strong, making it difficult to shorten the total track length.

Preferably, the imaging lens according to the present invention satisfies a conditional expression (5) below:

$$0.70<f3/f<1.50 \qquad (5)$$

where f: focal length of the overall optical system of the imaging lens f3: focal length of the third lens.

The conditional expression (5) defines an adequate range for the positive refractive power of the third lens with respect to the refractive power of the overall optical system of the imaging lens, and indicates a condition to correct spherical aberrations and coma aberrations properly. If the value is below the lower limit of the conditional expression (5), the positive refractive power of the third lens would be too strong, undesirably causing an increase in spherical aberrations and coma aberrations. On the other hand, if the value is above the upper limit of the conditional expression (5), the positive refractive power of the third lens would be too weak, making it difficult to shorten the total track length.

In the imaging lens according to the present invention, preferably the fourth lens is a meniscus lens with the weakest positive refractive power having, near the optical axis, a convex surface on the object side and a concave surface on the image side, in which an aspheric surface having a pole-change point in a position off the optical axis within the effective diameter is formed on each of the object-side and image-side surfaces. The presence of the pole-change points on the object-side and image-side aspheric surfaces implies that the surface of the peripheral portion of each of these surfaces starts to curve toward the object side direction at the pole-change point. These aspheric shapes are effective in correcting distortion, field curvature and astigmatic difference which increase on the lens peripheral portions as the field of view becomes wider.

In the imaging lens according to the present invention, preferably the fifth lens is a lens with negative refractive power having a concave surface on the image side near the optical axis, in which an aspheric surface having a pole-change point in a position off the optical axis within the effective diameter is formed on each of the object-side and image-side surfaces. By forming the pole-change points on the object-side and image-side aspheric surfaces, in combination with the aberration correction effect of the fourth lens, the fifth lens makes a final correction of distortion and field curvature, and also controls the angle of light rays incident on the image sensor within an adequate range. Furthermore, the negative refractive power of the concave image-side surface near the optical axis makes it easy to ensure an adequate back focus. Desirably the fifth lens's portion near the optical axis has a meniscus shape having a convex object-side surface, but the fifth lens may be a biconcave lens in which the object-side surface is concave.

Here, a "pole-change point" means a point on an aspheric surface at which a tangential plane in contact with a lens surface intersects the optical axis perpendicularly.

Preferably, the imaging lens according to the present invention satisfies a conditional expression (6) below:

$$0.6 < TTL/2ih < 1.0 \quad (6)$$

where

TTL: distance on the optical axis from the aperture stop to the image plane without a filter, etc.

ih: maximum image height.

The conditional expression (6) defines an adequate range for the ratio of total track length to maximum image height. In the wide-angle imaging lens according to the present invention, if the value is above the upper limit of the conditional expression (6), the total track length would be too long, making it difficult to realize a low-profile imaging lens which meets the recent demand. On the other hand, if the value is below the lower limit of the conditional expression (6), the total track length would be too short and it would be difficult to correct various aberrations properly and the space for the five constituent lenses would be too small. If the space for the constituent lenses is too small, the following problems would arise: the constituent lenses are too thin to manufacture, it is difficult to make adequate aspheric shapes, and manufacturing error sensitivity becomes high.

All the constituent lenses of the imaging lens according to the present invention can be made of plastic material and if so, the manufacturing process is easier and production cost can be lowered. In other words, a high-performance imaging lens can be supplied at low cost. Furthermore, in order to correct various aberrations more effectively, it is desirable that all the surfaces of the five constituent lenses of the imaging lens be aspheric surfaces.

DETAILED DESCRIPTION OF THE PREFERRED EMBODIMENTS

Hereinafter, a preferred embodiment of the present invention will be described in detail referring to the accompanying drawings. FIGS. 1, 3, 5, 7, and 9 are schematic views showing the general configurations of the imaging lenses in Examples 1 to 5 according to the preferred embodiment respectively. Since all these examples have the same basic configuration, a general explanation of an imaging lens according to this embodiment is given below referring to the schematic view of Example 1.

Figure 1:
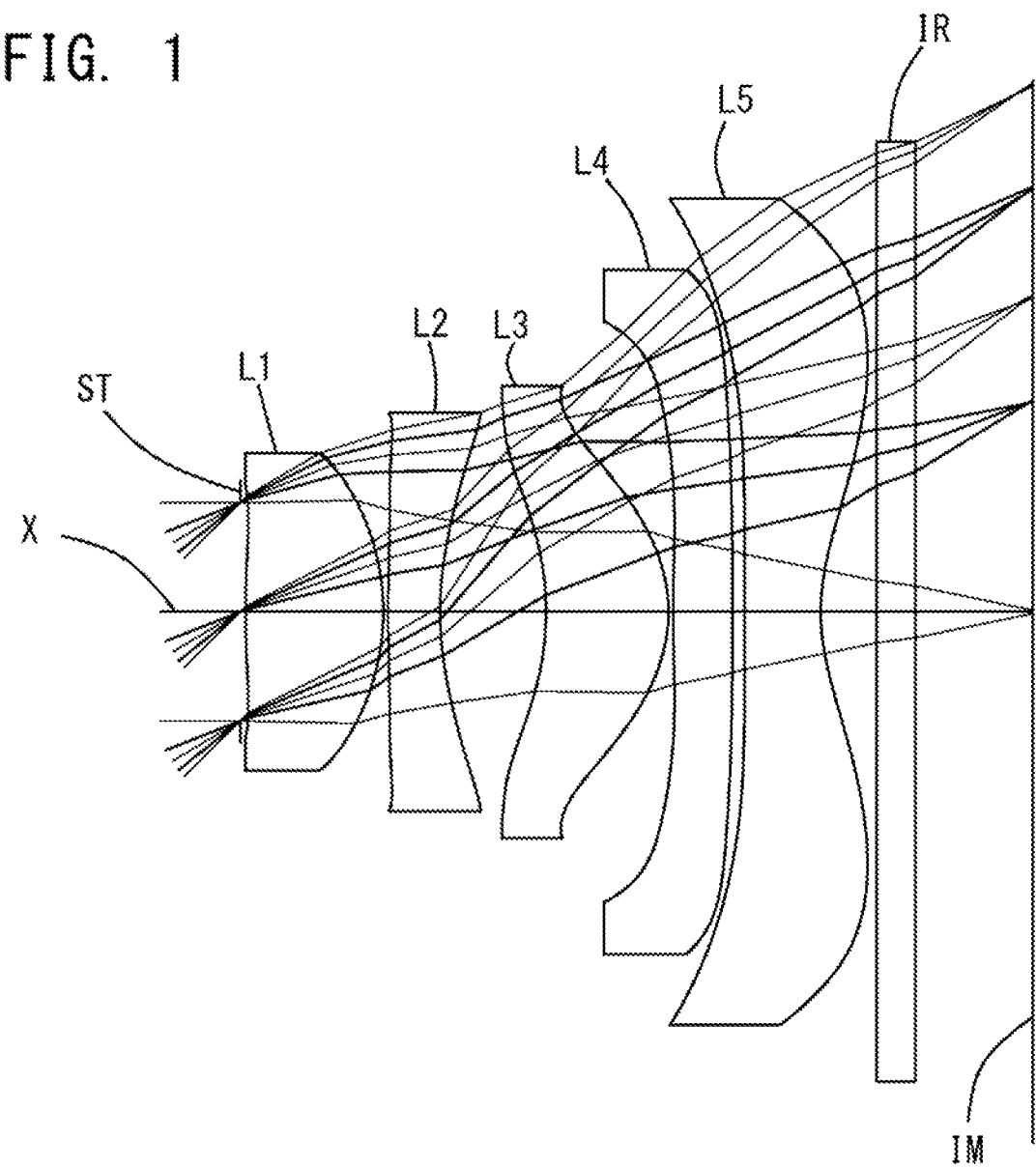
FIG. 1 is a schematic view showing the general configuration of an imaging lens in Example 1.

As shown in FIG. 1, in the imaging lens according to this embodiment, elements are arranged in the following order from an object side to an image side: an aperture stop ST, a first lens L1 with positive refractive power, a second lens L2 with negative refractive power, a third lens L3 with positive refractive power, a fourth lens L4 with positive refractive power, and a fifth lens L5 with negative refractive power.

A filter IR as a plane-parallel plate is located between the fifth lens L5 and the image plane IM. This filter IR is omissible. Since where an image is formed in the optical system varies depending on the filter thickness, in the present invention, total track length is defined as the distance on an optical axis X from the aperture stop ST to the image plane IM without the filter IR.

In the imaging lens composed of the above five constituent lenses, the first lens L1 is a double-sided aspheric lens in which the object-side surface and the image-side surface are both convex surfaces, the second lens L2 is a meniscus double-sided aspheric lens in which the image-side surface is a concave surface, the third lens L3 is a meniscus double-sided aspheric lens in which the image-side surface is a convex surface, the fourth lens L4 is a meniscus double-sided aspheric lens in which the object-side surface is convex near the optical axis x, and the fifth lens L5 is a meniscus double-sided aspheric lens in which the image-side surface is concave near the optical axis X.

In the first lens L1, the curvature radius of the object-side surface is larger than the curvature radius of the image-side surface so that rays of light are easily received with a wide field of view. Spherical aberrations of the first lens L1 are corrected through both the aspheric surfaces.

The second lens L2 has optimum negative refractive power for the refractive power of the overall optical system of the imaging lens and is mainly responsible for the correction of spherical aberrations of the first lens L1, axial chromatic aberrations and chromatic aberrations of magnification properly through both the aspheric surfaces.

The third lens L3 has optimum positive refractive power for the refractive power of the overall optical system of the imaging lens and corrects astigmatism and field curvature properly through both the aspheric surfaces.

The fourth lens L4 is a meniscus lens with the weakest positive refractive power in which near the optical axis X, the object-side surface is convex and the image-side surface is concave. In each of the object-side and image-side surfaces, an aspheric surface having one pole-change point in a position off the optical axis X within the effective diameter is formed. Specifically, in each of the peripheral portion of the object-side surface and the peripheral portion of the image-side surface, the surface starts to curve toward the object side direction at the pole-change point. These aspheric shapes are effective in correcting distortion, field curvature and astigmatic difference which increase on the lens peripheral portions as the field of view becomes wider.

The fifth lens L5 is a meniscus lens with negative refractive power having a concave surface on the image side near the optical axis X. In each of the object-side and image-side surfaces, an aspheric surface having a pole-change point in a position off the optical axis X within the effective diameter is formed. Specifically, in each of the peripheral portion of the object-side surface and the peripheral portion of the image-side surface, the surface starts to curve toward the object side direction at the pole-change point. In combination with the aberration correction effect of the fourth lens L4, these aspheric shapes make a final correction of distortion and field curvature, and also control the angle of light rays incident on the image plane IM within an adequate range. Furthermore, the negative refractive power of the image-side surface near the optical axis X makes it easy to ensure an adequate back focus. Desirably the fifth lens L5's portion near the optical axis X has a meniscus shape having a convex surface on the object side, but it may have a biconcave shape in which the object-side surface is concave and in that case, the object-side surface need not have a pole-change point.

The imaging lens according to this embodiment uses plastic material for all the constituent lenses so that it can be mass-produced at low cost. More specifically, for the first lens L1, the third lens L3, the fourth lens L4, and the fifth lens L5, a low-dispersion cycloolefin plastic material with an Abbe number of 50 to 60 is used, and for the second lens L2, a high-dispersion polycarbonate plastic material with an Abbe number of 20 to 30 is used. The use of the high-dispersion material for the second lens L2 contributes to proper correction of chromatic aberrations.

The imaging lens according to the present invention satisfies the following conditional expressions:

$$|r1| > |r2| \quad (1)$$

$$0.9 < ih/f < 1.1 \quad (2)$$

$$2.20 < |r1/r2| < 8.20 \quad (3)$$

$$-1.50 < f2/f < -1.00 \quad (4)$$

$$0.70 < f3/f < 1.50 \quad (5)$$

$$0.6 < TTL/2ih < 1.0 \quad (6)$$

where
r1: curvature radius of the object-side surface of the first lens L1
r2: curvature radius of the image-side surface of the first lens L1
ih: maximum image height
f: focal length of the overall optical system of the imaging lens
f2: focal length of the second lens L2
f3: focal length of the third lens L3
TTL: distance on the optical axis X from the aperture stop ST to the image plane IM without the filter IR, etc.

In this embodiment, all the lens surfaces are aspheric. The aspheric shapes of these lens surfaces are expressed by Equation 1, where Z represents an axis in the optical axis direction, H represents a height in the direction perpendicular to the optical axis, k represents a conic constant, and A4, A6, A8, A10, A12, A14, and A16 represent aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, examples of an imaging lens according to this embodiment will be described. In the description of each example, f represents the focal length of the overall optical system of the imaging lens, Fno represents an F-number, ω represents a half field of view, and ih represents a maximum image height. i represents a surface number counted from the object side, r represents a curvature radius, d represents the distance between lens surfaces on the optical axis (surface distance), Nd represents a refractive index at d-ray (reference wavelength), and vd represents an Abbe number at d-ray. As for aspheric surfaces, an asterisk (*) after surface number i indicates that the surface concerned is an aspheric surface.

EXAMPLE 1

The basic lens data of Example 1 is shown below in Table 1.

TABLE 1

Example 1
in mm $f = 2.86$
$Fno = 2.42$
$\omega(°) = 44.7$
$ih = 2.85$

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | 0.030 | | |
| 2* | 5.376 | 0.743 | 1.544 | 55.57 |
| 3* | −1.264 | 0.026 | | |
| 4* | 8.220 | 0.280 | 1.635 | 23.91 |
| 5* | 1.701 | 0.573 | | |
| 6* | −1.547 | 0.661 | 1.544 | 55.57 |
| 7* | −0.830 | 0.025 | | |
| 8* | 6.315 | 0.319 | 1.535 | 56.16 |
| 9* | 106.964 | 0.066 | | |
| 10* | 45.540 | 0.412 | 1.535 | 56.16 |
| 11* | 1.120 | 0.300 | | |
| 12 | Infinity | 0.210 | 1.517 | 64.20 |
| 13 | Infinity | 0.637 | | |
| Image Plane | Infinity | | | |

Constituent Lens Data

| Lens | Start Surface | Focal Length |
|---|---|---|
| 1 | 2 | 1.959 |
| 2 | 4 | −3.431 |
| 3 | 6 | 2.485 |
| 4 | 8 | 12.539 |
| 5 | 10 | −2.154 |

Aspheric Surface Data

| | 2nd Surface | 3rd Surface | 4th Surface | 5th Surface | 6th Surface |
|---|---|---|---|---|---|
| k | 0.000E+00 | −1.067E+01 | 0.000E+00 | −9.535E+00 | 3.921E−01 |
| A4 | −5.481E−02 | −5.007E−01 | −1.097E−01 | 2.929E−03 | 6.196E−02 |
| A6 | −6.553E−01 | 7.506E−01 | −5.797E−02 | 4.613E−02 | −8.947E−02 |
| A8 | 1.673E+00 | −1.373E+00 | 3.750E−01 | −1.081E−01 | 4.402E−01 |
| A10 | −2.072E+00 | 1.824E+00 | −2.876E−01 | 1.273E−01 | −1.945E−01 |
| A12 | 0.000E+00 | −1.175E+00 | 4.022E−02 | −5.342E−02 | −2.097E−01 |
| A14 | 0.000E+00 | 0.000E+00 | 0.000E+00 | −6.225E−03 | 2.235E−01 |
| A16 | 0.000E+00 | 0.000E+00 | 0.000E+00 | 0.000E+00 | −6.217E−02 |

| | 7th Surface | 8th Surface | 9th Surface | 10th Surface | 11th Surface |
|---|---|---|---|---|---|
| k | −4.229E+00 | 1.637E+00 | 0.000E+00 | 0.000E+00 | −4.975E+00 |
| A4 | −5.872E−01 | −2.174E−01 | −4.283E−02 | −3.089E−02 | −1.263E−01 |
| A6 | 9.530E−01 | 1.351E−01 | 2.510E−02 | 3.830E−03 | 8.044E−02 |
| A8 | −1.268E+00 | −3.458E−02 | −5.584E−03 | −2.637E−04 | −4.520E−02 |
| A10 | 1.194E+00 | 0.000E+00 | 0.000E+00 | 0.000E+00 | 1.792E−02 |
| A12 | −5.571E−01 | 0.000E+00 | 0.000E+00 | 0.000E+00 | −4.491E−03 |
| A14 | 9.953E−02 | 0.000E+00 | 0.000E+00 | 0.000E+00 | 6.060E−04 |
| A16 | 0.000E+00 | 0.000E+00 | 0.000E+00 | 0.000E+00 | −3.310E−05 |

As shown in Table 6, the imaging lens in Example 1 satisfies all the conditional expressions (1) to (6).

Figure 2:
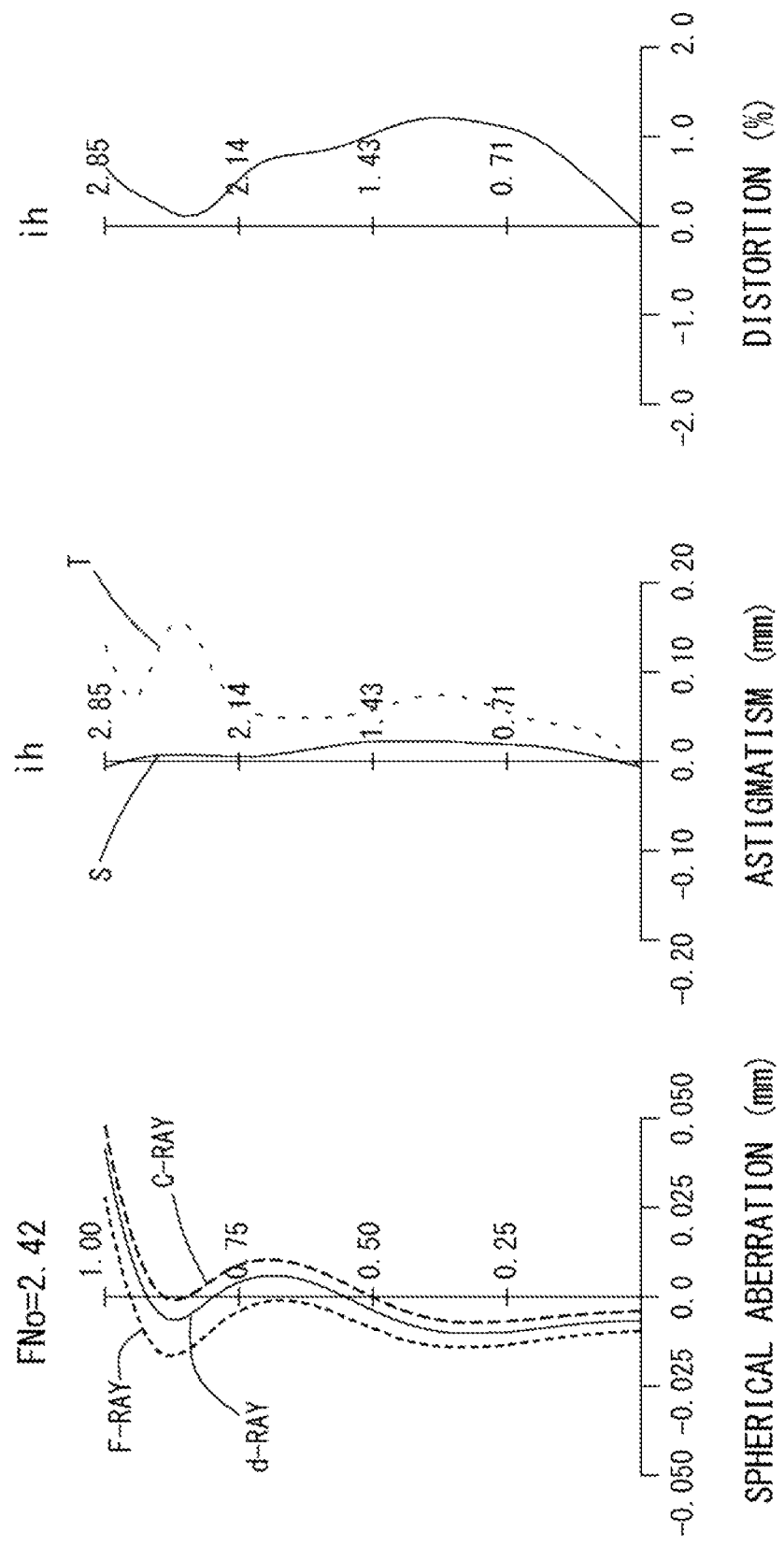
FIG. 2 shows spherical aberration, astigmatism, and distortion of the imaging lens in Example 1.
Figure 3:
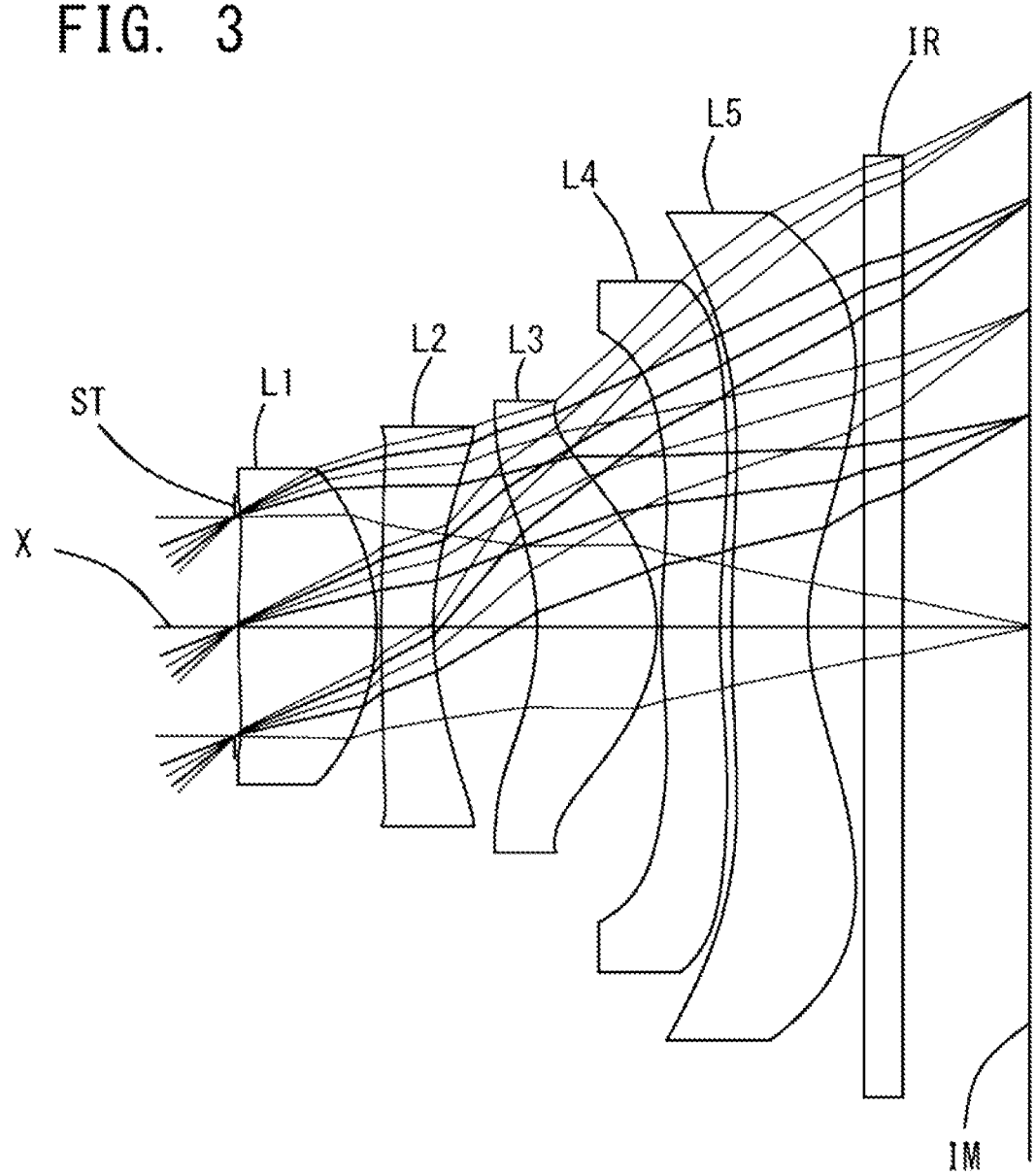
FIG. 3 is a schematic view showing the general configuration of an imaging lens in Example 2.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration on sagittal image surface S and the amount of aberration on tangential image surface T (the same is true for FIGS. 4, 6, 8, and 10). As shown in FIG. 2, each aberration is properly corrected.

The imaging lens provides a wide field of view of about 90 degrees and high brightness with an F-value of 2.4 or so. Its total track length TTL is as short as 4.20 mm and the ratio of total track length TTL to maximum image height ih (TTL/2ih) is 0.74, so it achieves low-profileness though it is composed of five constituent lenses.

EXAMPLE 2

The basic lens data of Example 2 is shown below in Table 2.

TABLE 2

Example 2
in mm f = 2.86
Fno = 2.42
ω(°) = 44.7
ih = 2.85

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | 0.021 | | |
| 2* | 5.417 | 0.742 | 1.544 | 55.57 |
| 3* | −1.269 | 0.025 | | |
| 4* | 7.599 | 0.280 | 1.635 | 23.91 |
| 5* | 1.661 | 0.558 | | |
| 6* | −1.484 | 0.644 | 1.544 | 55.57 |
| 7* | −0.865 | 0.025 | | |
| 8* | 3.261 | 0.315 | 1.535 | 56.16 |
| 9* | 4.254 | 0.062 | | |
| 10* | 7.279 | 0.410 | 1.535 | 56.16 |
| 11* | 1.2087 | 0.300 | | |
| 12 | Infinity | 0.210 | 1.517 | 64.20 |
| 13 | Infinity | 0.683 | | |
| Image Plane | Infinity | | | |

Constituent Lens Data

| Lens | Start Surface | Focal Length |
|---|---|---|
| 1 | 2 | 1.968 |
| 2 | 4 | −3.406 |
| 3 | 6 | 2.789 |
| 4 | 8 | 23.544 |
| 5 | 10 | −2.776 |

Aspheric Surface Data

| | 2nd Surface | 3rd Surface | 4th Surface | 5th Surface | 6th Surface |
|---|---|---|---|---|---|
| k | 0.000E+00 | −1.090E+01 | 0.000E+00 | −9.511E+00 | 2.626E−01 |
| A4 | −6.441E−02 | −4.927E−01 | −1.100E−01 | 3.777E−03 | 1.060E−01 |
| A6 | −6.054E−01 | 7.384E−01 | −5.458E−02 | 5.149E−02 | −1.048E−01 |
| A8 | 1.635E+00 | −1.369E+00 | 3.684E−01 | −1.095E−01 | 4.312E−01 |
| A10 | −2.117E+00 | 1.826E+00 | −2.901E−01 | 1.176E−01 | −1.929E−01 |
| A12 | 0.000E+00 | −1.176E+00 | 4.037E−02 | −4.986E−02 | −2.099E−01 |
| A14 | 0.000E+00 | 0.000E+00 | 0.000E+00 | −6.136E−03 | 2.244E−01 |
| A16 | 0.000E+00 | 0.000E+00 | 0.000E+00 | 0.000E+00 | −6.216E−02 |

| | 7th Surface | 8th Surface | 9th Surface | 10th Surface | 11th Surface |
|---|---|---|---|---|---|
| k | −4.520E+00 | −3.711E+00 | 0.000E+00 | 0.000E+00 | −4.851E+00 |
| A4 | −5.860E−01 | −2.448E−01 | −1.228E−01 | −4.596E−02 | −1.185E−01 |
| A6 | 9.733E−01 | 1.326E−01 | 4.712E−02 | 3.492E−03 | 7.877E−02 |
| A8 | −1.273E+00 | −3.061E−02 | −7.851E−03 | 9.269E−06 | −4.543E−02 |
| A10 | 1.186E+00 | 0.000E+00 | 0.000E+00 | 0.000E+00 | 1.781E−02 |
| A12 | −5.592E−01 | 0.000E+00 | 0.000E+00 | 0.000E+00 | −4.399E−03 |
| A14 | 1.028E−01 | 0.000E+00 | 0.000E+00 | 0.000E+00 | 5.910E−04 |
| A16 | 0.000E+00 | 0.000E+00 | 0.000E+00 | 0.000E+00 | −3.239E−05 |

As shown in Table 6, the imaging lens in Example 2 satisfies all the conditional expressions (1) to (6).

Figure 4:
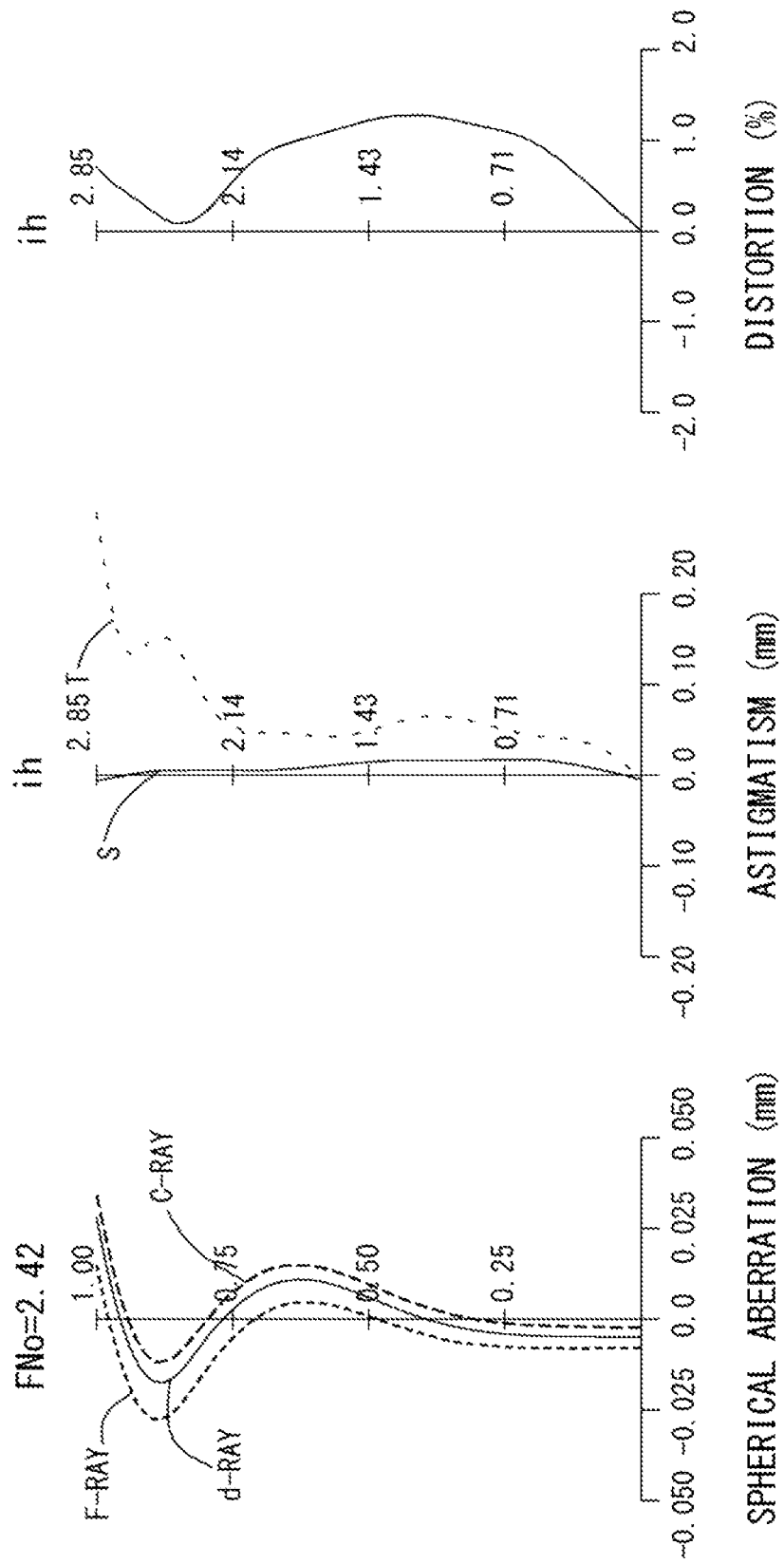
FIG. 4 shows spherical aberration, astigmatism, and distortion of the imaging lens in Example 2.
Figure 5:
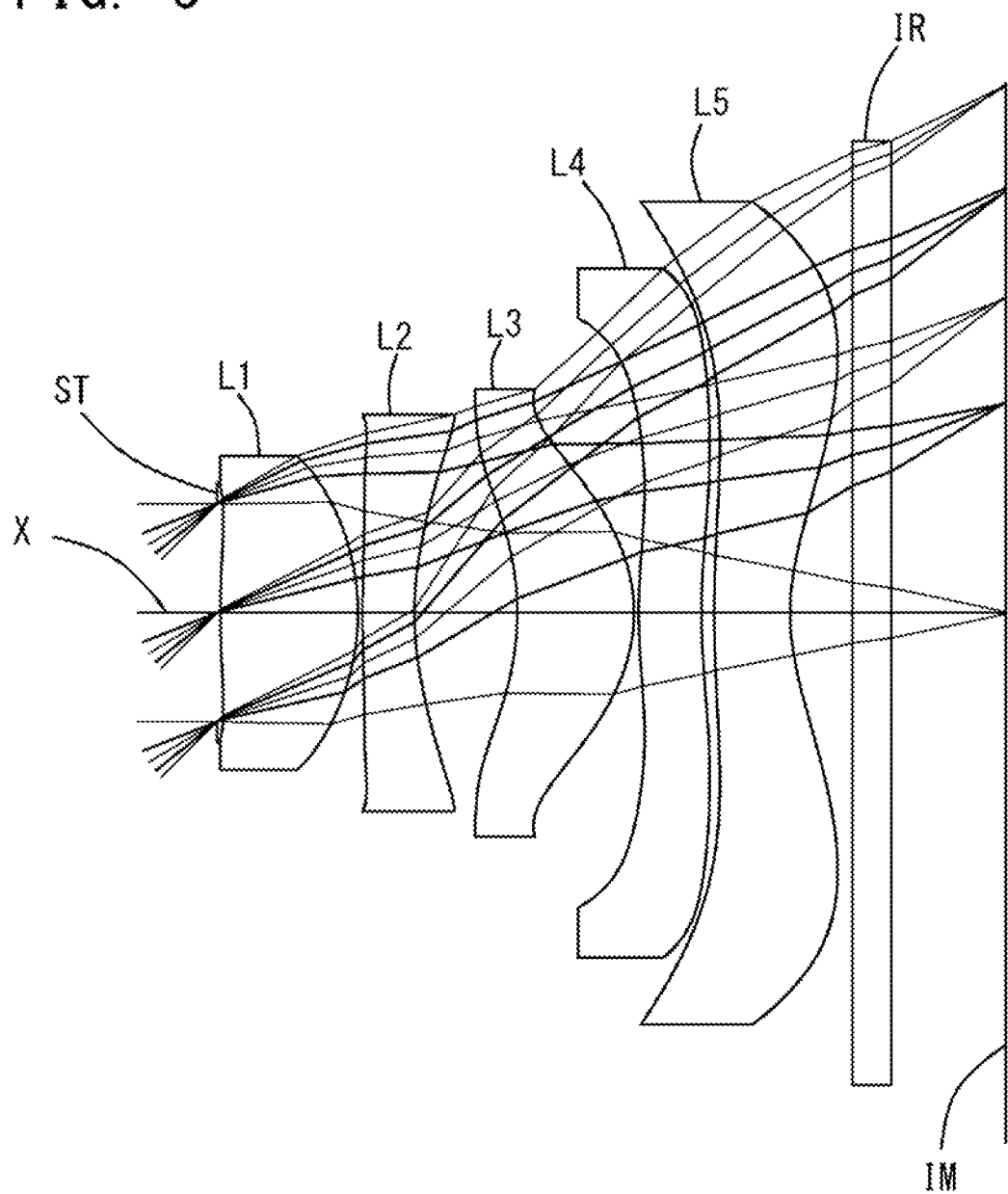
FIG. 5 is a schematic view showing the general configuration of an imaging lens in Example 3.

FIG. 4 shows spherical aberration (mm), astigmatism (mm), and distortion (%) of the imaging lens in Example 2. As shown in FIG. 4, each aberration is properly corrected.

The imaging lens provides a wide field of view of about 90 degrees and high brightness with an F-value of 2.4 or so. Its total track length TTL is as short as 4.19 mm and the ratio of total track length TTL to maximum image height ih (TTL/2ih) is 0.74, so it achieves low-profileness though it is composed of five constituent lenses.

EXAMPLE 3

The basic lens data of Example 3 is shown below in Table 3.

TABLE 3

Example 3
in mm $f = 2.86$
$Fno = 2.42$
$\omega(°) = 44.8$
$ih = 2.85$

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | 0.020 | | |
| 2* | 5.399 | 0.744 | 1.544 | 55.57 |
| 3* | −1.267 | 0.025 | | |
| 4* | 7.953 | 0.280 | 1.635 | 23.91 |
| 5* | 1.683 | 0.558 | | |
| 6* | −1.458 | 0.632 | 1.544 | 55.57 |
| 7* | −0.882 | 0.025 | | |
| 8* | 3.054 | 0.341 | 1.535 | 56.16 |
| 9* | 3.775 | 0.069 | | |
| 10* | 6.919 | 0.410 | 1.535 | 56.16 |
| 11* | 1.258 | 0.337 | | |
| 12 | Infinity | 0.210 | 1.517 | 64.20 |
| 13 | Infinity | 0.624 | | |
| Image Plane | Infinity | | | |

Constituent Lens Data

| Lens | Start Surface | Focal Length |
|---|---|---|
| 1 | 2 | 1.965 |
| 2 | 4 | −3.418 |
| 3 | 6 | 2.964 |
| 4 | 8 | 25.671 |
| 5 | 10 | −2.951 |

Aspheric Surface Data

| | 2nd Surface | 3rd Surface | 4th Surface | 5th Surface | 6th Surface |
|---|---|---|---|---|---|
| k | 0.000E+00 | −1.070E+01 | 0.000E+00 | −9.522E+00 | 2.510E−01 |
| A4 | −6.215E−02 | −4.916E−01 | −1.099E−01 | 1.952E−03 | 1.112E−01 |
| A6 | −6.172E−01 | 7.376E−01 | −5.274E−02 | 5.299E−02 | −1.049E−01 |
| A8 | 1.641E+00 | −1.370E+00 | 3.689E−01 | −1.080E−01 | 4.323E−01 |
| A10 | −2.092E+00 | 1.833E+00 | −2.903E−01 | 1.174E−01 | −1.902E−01 |
| A12 | 0.000E+00 | −1.176E+00 | 4.039E−02 | −5.078E−02 | −2.099E−01 |
| A14 | 0.000E+00 | 0.000E+00 | 0.000E+00 | −5.748E−03 | 2.245E−01 |
| A16 | 0.000E+00 | 0.000E+00 | 0.000E+00 | 0.000E+00 | −6.215E−02 |

| | 7th Surface | 8th Surface | 9th Surface | 10th Surface | 11th Surface |
|---|---|---|---|---|---|
| k | −4.610E+00 | −2.897E+00 | 0.000E+00 | 0.000E+00 | −4.647E+00 |
| A4 | −5.935E−01 | −2.541E−01 | −1.343E−01 | −4.736E−02 | −1.177E−01 |
| A6 | 9.766E−01 | 1.348E−01 | 5.055E−02 | 3.213E−03 | 7.866E−02 |
| A8 | −1.271E+00 | −3.032E−02 | −8.192E−03 | 1.583E−05 | −4.571E−02 |
| A10 | 1.187E+00 | 0.000E+00 | 0.000E+00 | 0.000E+00 | 1.788E−02 |
| A12 | −5.594E−01 | 0.000E+00 | 0.000E+00 | 0.000E+00 | −4.397E−03 |
| A14 | 1.025E−01 | 0.000E+00 | 0.000E+00 | 0.000E+00 | 5.890E−04 |
| A16 | 0.000E+00 | 0.000E+00 | 0.000E+00 | 0.000E+00 | −3.225E−05 |

As shown in Table 6, the imaging lens in Example 3 satisfies all the conditional expressions (1) to (6).

Figure 6:
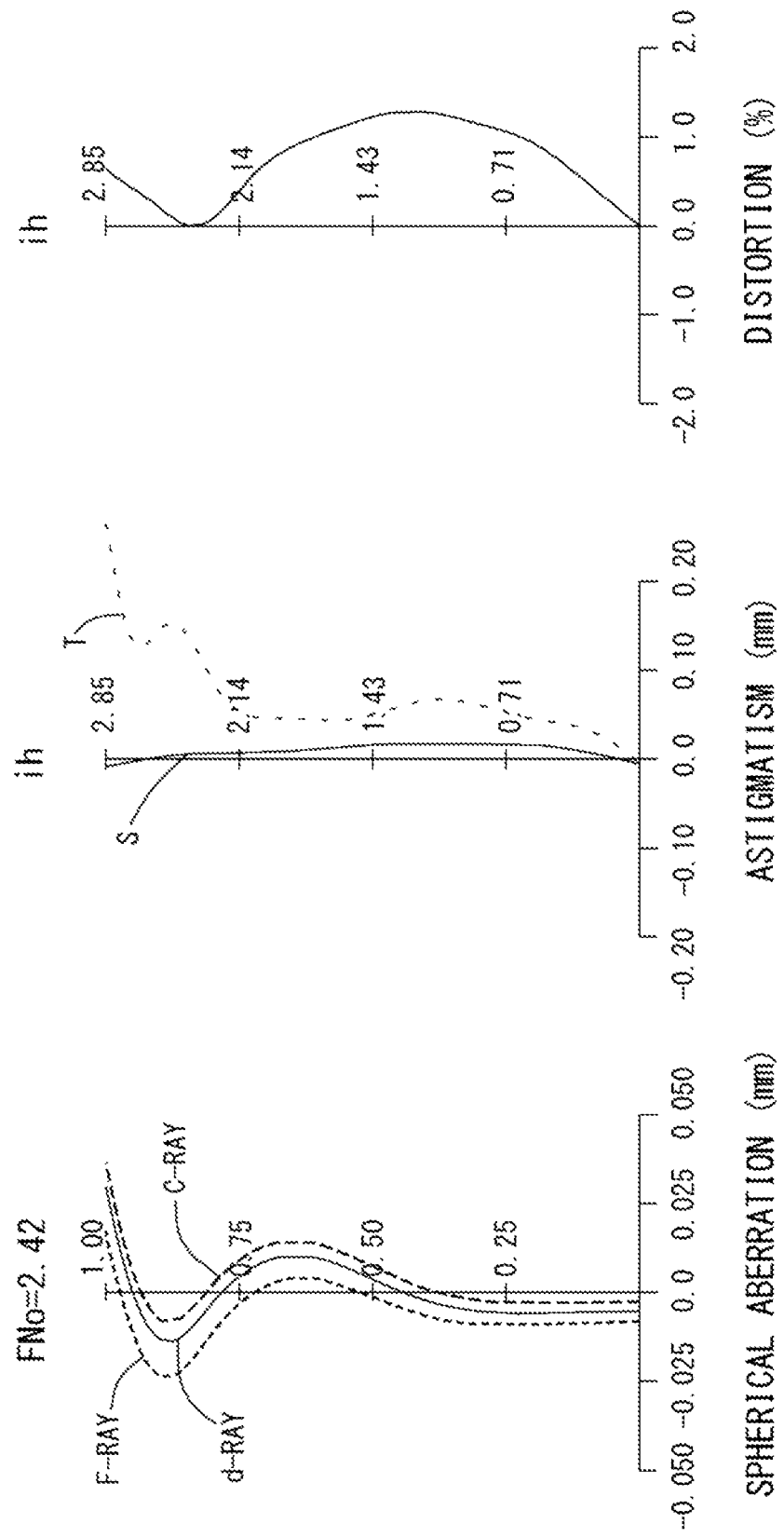
FIG. 6 shows spherical aberration, astigmatism, and distortion of the imaging lens in Example 3.
Figure 7:
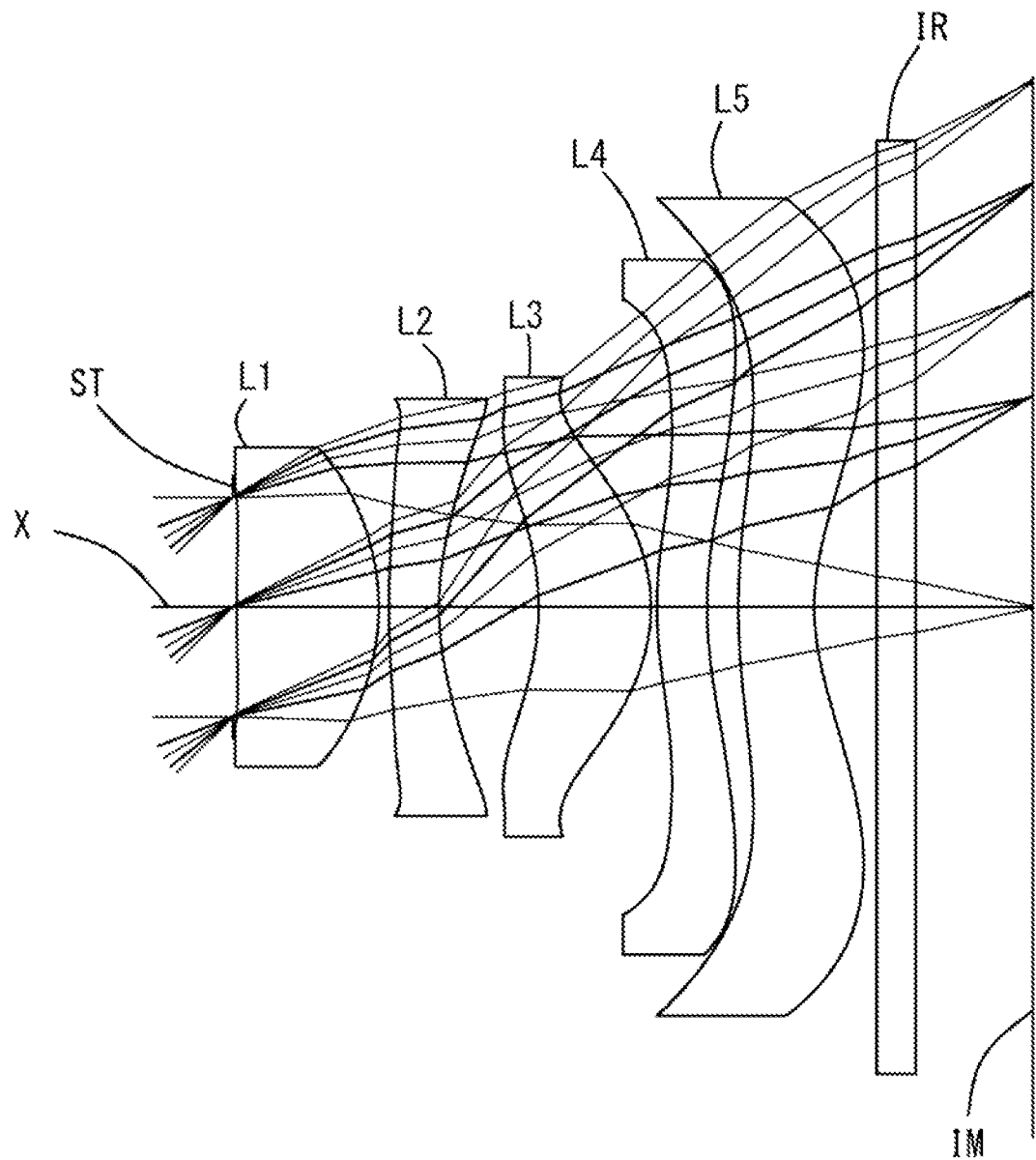
FIG. 7 is a schematic view showing the general configuration of an imaging lens in Example 4.

FIG. 6 shows spherical aberration (mm), astigmatism (mm), and distortion (%) of the imaging lens in Example 3. As shown in FIG. 6, each aberration is properly corrected.

The imaging lens provides a wide field of view of about 90 degrees and high brightness with an F-value of 2.4 or so. Its total track length TTL is as short as 4.19 mm and the ratio of total track length TTL to maximum image height ih (TTL/2ih) is 0.74, so it achieves low-profileness though it is composed of five constituent lenses.

EXAMPLE 4

The basic lens data of Example 4 is shown below in Table 4.

TABLE 4

Example 4
in mm f = 2.87
Fno = 2.46
ω(°) = 44.7
ih = 2.85

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | 0.020 | | |
| 2* | 9.500 | 0.767 | 1.544 | 55.57 |
| 3* | −1.268 | 0.055 | | |
| 4* | 4.464 | 0.270 | 1.635 | 23.91 |
| 5* | 1.543 | 0.538 | | |
| 6* | −1.417 | 0.607 | 1.544 | 55.57 |
| 7* | −0.953 | 0.032 | | |
| 8* | 2.073 | 0.271 | 1.535 | 56.16 |
| 9* | 2.243 | 0.169 | | |
| 10* | 3.638 | 0.410 | 1.535 | 56.16 |
| 11* | 1.291 | 0.337 | | |
| 12 | Infinity | 0.210 | 1.517 | 64.20 |
| 13 | Infinity | 0.635 | | |
| Image Plane | Infinity | | | |

Constituent Lens Data

| Lens | Start Surface | Focal Length |
|---|---|---|
| 1 | 2 | 2.110 |
| 2 | 4 | −3.850 |
| 3 | 6 | 3.664 |
| 4 | 8 | 32.921 |
| 5 | 10 | −3.984 |

Aspheric Surface Data

| | 2nd Surface | 3rd Surface | 4th Surface | 5th Surface | 6th Surface |
|---|---|---|---|---|---|
| k | 0.000E+00 | −1.022E+01 | 0.000E+00 | −6.200E+00 | 1.846E−01 |
| A4 | −6.109E−02 | −4.793E−01 | −1.186E−01 | −3.728E−02 | 1.606E−01 |
| A6 | −5.878E−01 | 7.284E−01 | −7.674E−02 | 6.930E−02 | −1.076E−01 |
| A8 | 1.517E+00 | −1.384E+00 | 3.369E−01 | −9.313E−02 | 4.239E−01 |
| A10 | −1.817E+00 | 1.902E+00 | −1.941E−01 | 1.192E−01 | −1.920E−01 |
| A12 | 0.000E+00 | −1.174E+00 | 0.000E+00 | −6.097E−02 | −2.061E−01 |
| A14 | 0.000E+00 | 0.000E+00 | 0.000E+00 | 0.000E+00 | 2.243E−01 |
| A16 | 0.000E+00 | 0.000E+00 | 0.000E+00 | 0.000E+00 | −6.194E−02 |

| | 7th Surface | 8th Surface | 9th Surface | 10th Surface | 11th Surface |
|---|---|---|---|---|---|
| k | −5.462E+00 | −1.182E+00 | 0.000E+00 | 0.000E+00 | −3.416E+00 |
| A4 | −5.923E−01 | −2.542E−01 | −1.446E−01 | −6.492E−02 | −1.311E−01 |
| A6 | 9.890E−01 | 1.208E−01 | 4.357E−02 | 3.083E−03 | 7.851E−02 |
| A8 | −1.271E+00 | −2.459E−02 | −7.494E−03 | 0.000E+00 | −4.457E−02 |
| A10 | 1.186E+00 | 0.000E+00 | 0.000E+00 | 0.000E+00 | 1.779E−02 |
| A12 | −5.600E−01 | 0.000E+00 | 0.000E+00 | 0.000E+00 | −4.425E−03 |
| A14 | 1.008E−01 | 0.000E+00 | 0.000E+00 | 0.000E+00 | 5.945E−04 |
| A16 | 0.000E+00 | 0.000E+00 | 0.000E+00 | 0.000E+00 | −3.267E−05 |

As shown in Table 6, the imaging lens in Example 4 satisfies all the conditional expressions (1) to (6).

Figure 8:
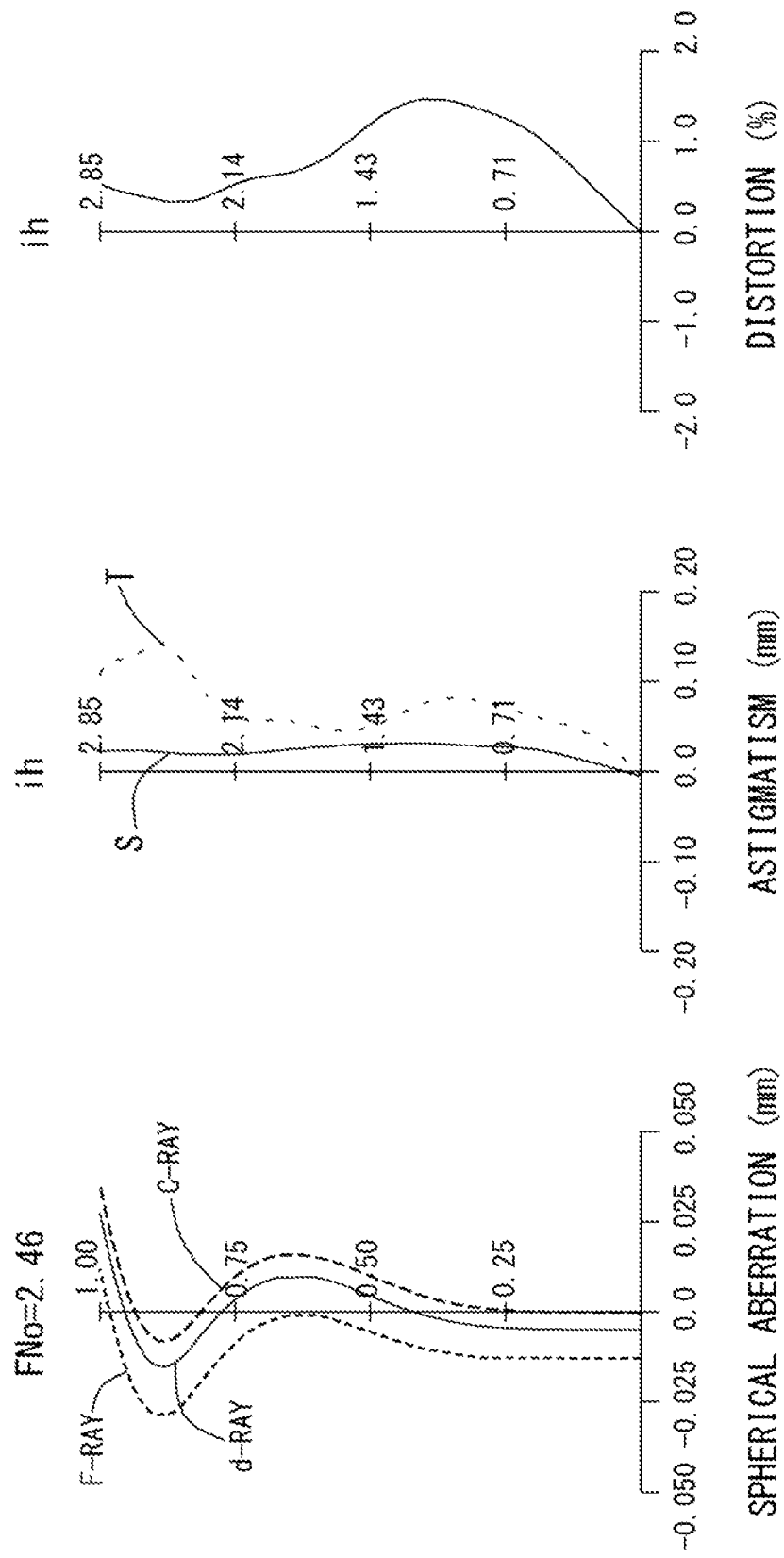
FIG. 8 shows spherical aberration, astigmatism, and distortion of the imaging lens in Example 4.
Figure 9:
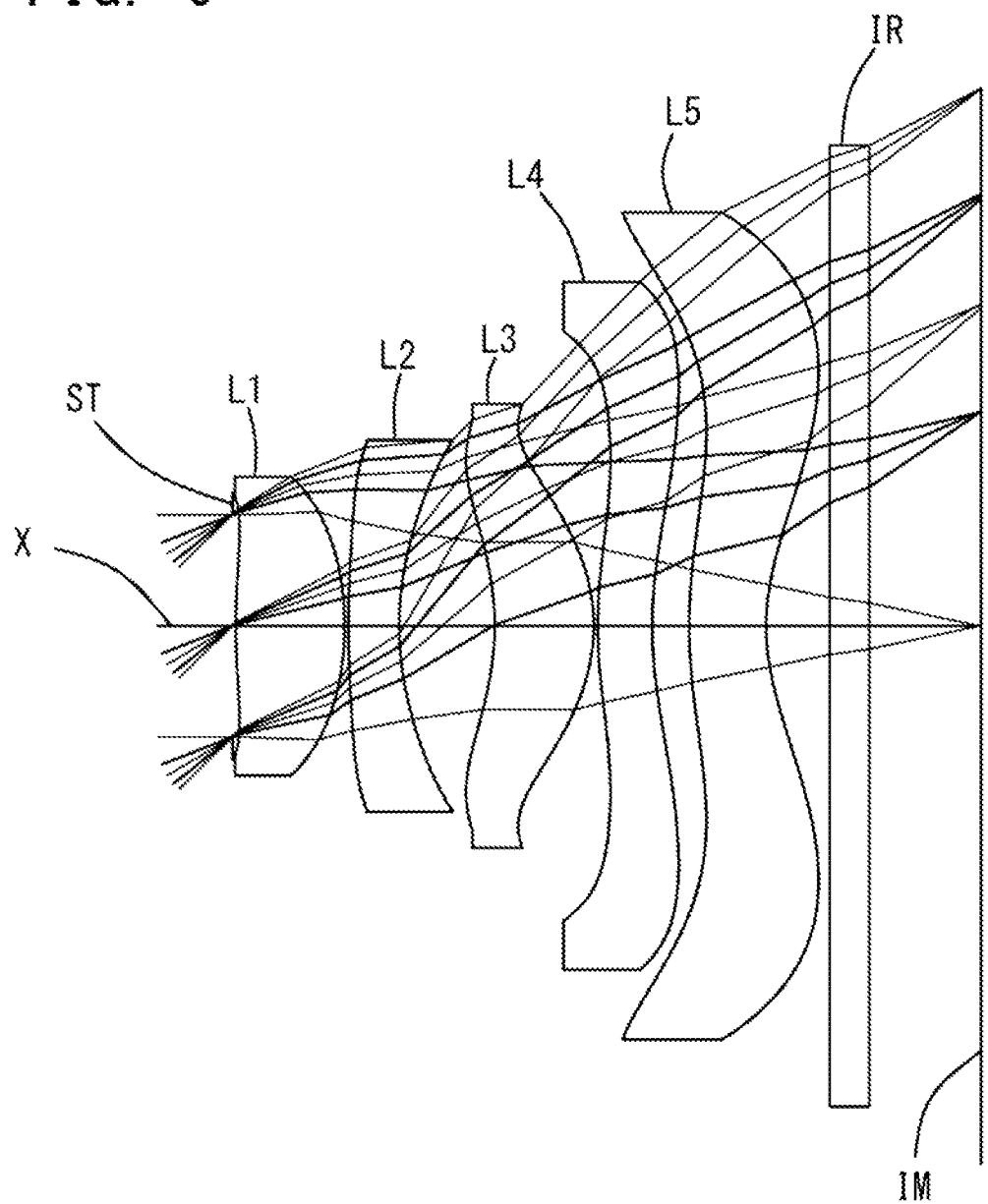
FIG. 9 is a schematic view showing the general configuration of an imaging lens in Example 5.

FIG. 8 shows spherical aberration (mm), astigmatism (mm), and distortion (%) of the imaging lens in Example 4. As shown in FIG. 8, each aberration is properly corrected.

The imaging lens provides a wide field of view of about 90 degrees and high brightness with an F-value of 2.4 or so. Its total track length TTL is as short as 4.24 mm and the ratio of total track length TTL to maximum image height ih (TTL/2ih) is 0.74, so it achieves low-profileness though it is composed of five constituent lenses.

EXAMPLE 5

The basic lens data of Example 5 is shown below in Table 5.

TABLE 5

Example 5
in mm f = 2.86
Fno = 2.42
ω(°) = 44.7
ih = 2.85

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | 0.020 | | |
| 2* | 3.822 | 0.577 | 1.544 | 55.57 |
| 3* | −1.570 | 0.020 | | |
| 4* | 5.263 | 0.270 | 1.635 | 23.91 |
| 5* | 1.664 | 0.506 | | |
| 6* | −1.469 | 0.527 | 1.544 | 55.57 |
| 7* | −0.955 | 0.020 | | |
| 8* | 2.300 | 0.290 | 1.544 | 55.57 |
| 9* | 2.220 | 0.197 | | |
| 10* | 2.782 | 0.407 | 1.544 | 55.57 |
| 11* | 1.166 | 0.337 | | |
| 12 | Infinity | 0.210 | 1.517 | 64.20 |
| 13 | Infinity | 0.594 | | |
| Image Plane | Infinity | | | |

Constituent Lens Data

| Lens | Start Surface | Focal Length |
|---|---|---|
| 1 | 2 | 2.127 |
| 2 | 4 | −3.944 |
| 3 | 6 | 3.685 |
| 4 | 8 | 423.838 |
| 5 | 10 | −4.048 |

Aspheric Surface Data

| | 2nd Surface | 3rd Surface | 4th Surface | 5th Surface | 6th Surface |
|---|---|---|---|---|---|
| k | 0.000E+00 | −1.399E+01 | 0.000E+00 | −1.921E+00 | 3.687E−03 |
| A4 | −1.216E−01 | −5.117E−01 | −7.483E−02 | −2.646E−02 | 1.899E−01 |
| A6 | −4.832E−01 | 6.659E−01 | −5.771E−02 | 5.200E−02 | −1.164E−01 |
| A8 | 8.908E−01 | −1.382E+00 | 3.084E−01 | −7.917E−02 | 4.195E−01 |
| A10 | −1.474E+00 | 1.725E+00 | −1.671E−01 | 1.337E−01 | −1.945E−01 |
| A12 | 0.000E+00 | −1.157E+00 | 0.000E+00 | −6.729E−02 | −2.092E−01 |
| A14 | 0.000E+00 | 0.000E+00 | 0.000E+00 | 0.000E+00 | 2.255E−01 |
| A16 | 0.000E+00 | 0.000E+00 | 0.000E+00 | 0.000E+00 | −6.184E−02 |

| | 7th Surface | 8th Surface | 9th Surface | 10th Surface | 11th Surface |
|---|---|---|---|---|---|
| k | −5.985E+00 | −5.732E−01 | 0.000E+00 | 0.000E+00 | −3.553E+00 |
| A4 | −5.739E−01 | −2.474E−01 | −1.478E−01 | −1.049E−01 | −1.304E−01 |
| A6 | 1.013E+00 | 1.177E−01 | 4.218E−02 | 9.023E−03 | 7.890E−02 |
| A8 | −1.260E+00 | −2.741E−02 | −7.774E−03 | 0.000E+00 | −4.562E−02 |
| A10 | 1.186E+00 | 0.000E+00 | 0.000E+00 | 0.000E+00 | 1.791E−02 |
| A12 | −5.615E−01 | 0.000E+00 | 0.000E+00 | 0.000E+00 | −4.406E−03 |
| A14 | 9.720E−02 | 0.000E+00 | 0.000E+00 | 0.000E+00 | 5.958E−04 |
| A16 | 0.000E+00 | 0.000E+00 | 0.000E+00 | 0.000E+00 | −3.346E−05 |

As shown in Table 6, the imaging lens in Example 5 satisfies all the conditional expressions (1) to (6).

Figure 10:
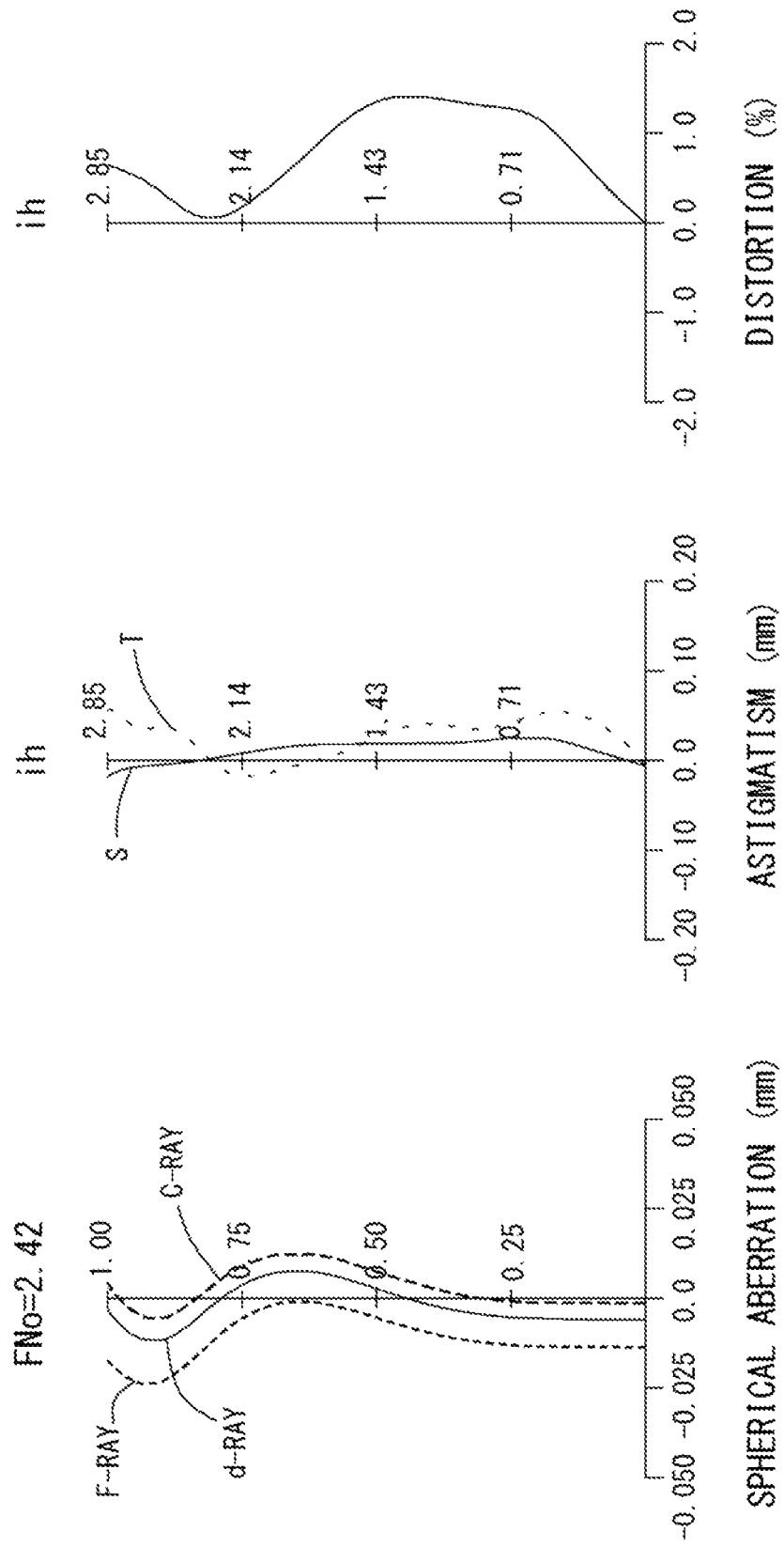
FIG. 10 shows spherical aberration, astigmatism, and distortion of the imaging lens in Example 5.

FIG. 10 shows spherical aberration (mm), astigmatism (mm), and distortion (%) of the imaging lens in Example 5. As shown in FIG. 10, each aberration is properly corrected.

The imaging lens provides a wide field of view of about 90 degrees and high brightness with an F-value of 2.4 or so. Its total track length TTL is as short as 3.89 mm and the ratio of total track length TTL to maximum image height ih (TTL/2ih) is 0.68, so it achieves low-profileness though it is composed of five constituent lenses.

As explained above, the imaging lenses according to the preferred embodiment of the present invention realize an optical system which provides a wide field of view of about 90 degrees and corrects aberrations properly. In addition, the ratio of total track length TTL to maximum image height ih (TTL/2ih) is 0.74 or less, offering a low-profile design. Also, they provide high brightness with an F-value of 2.4 or so.

Table 6 shows data on Examples 1 to 5 in relation to the conditional expressions (1) to (6).

TABLE 6

|  | Example 1 | Example 2 | Example 3 | Example 4 | Example 5 |
|---|---|---|---|---|---|
| Conditional Expression (1) $\|r1\| > \|r2\|$ | 5.37 > 1.26 | 5.41 > 1.27 | 5.39 > 1.27 | 9.5 > 1.27 | 3.82 > 1.57 |
| Conditional Expression (2) $0.9 < ih/f < 1.1$ | 1.00 | 1.00 | 1.00 | 1.00 | 1.00 |
| Conditional Expression (3) $2.20 < \|r1/r2\| < 8.20$ | 4.25 | 4.27 | 4.26 | 7.49 | 2.43 |
| Conditional Expression (4) $-1.50 < f2/f < -1.00$ | −1.20 | −1.19 | −1.20 | −1.34 | −1.38 |
| Conditional Expression (5) $0.70 < f3/f < 1.50$ | 0.87 | 0.98 | 1.04 | 1.28 | 1.29 |
| Conditional Expression (6) $0.6 < TTL/2ih < 1.0$ | 0.74 | 0.74 | 0.74 | 0.74 | 0.68 |

When the imaging lens composed of five lenses according to the preferred embodiment of the invention is used for an optical system built in an image pickup device mounted in an increasingly compact and low-profile mobile terminal such as a smart phone, mobile phone or PDA (Personal Digital Assistant), or a game console or information terminal such as a PC, a wide-angle high-performance camera can be realized.

The effects of the present invention are as follows.

According to the present invention, it is possible to provide a low-cost, compact and low-profile imaging lens with relatively high brightness, which provides a wide field of view which conventional lenses could hardly offer and corrects various aberrations properly.

What is claimed is:

1. An imaging lens for a solid-state image sensor in which elements are arranged in order from an object side to an image side, comprising:
   an aperture stop;
   a first lens with positive refractive power;
   a second lens as a meniscus lens with negative refractive power having a concave surface on the image side;
   a third lens with positive refractive power having a convex surface on the image side;
   a fourth lens as a meniscus double-sided aspheric lens having a convex surface on the object side near an optical axis; and
   a fifth lens as a double-sided aspheric lens with negative refractive power having a concave surface on the image side near the optical axis,
   wherein a conditional expression (1) below is satisfied:

$$|r1|>|r2| \quad (1)$$

where
r1: curvature radius of the object-side surface of the first lens, and
r2: curvature radius of the image-side surface of the first lens.

2. The imaging lens according to claim 1, wherein a conditional expression (2) below is satisfied:

$$0.9<ih/f<1.1 \quad (2)$$

where
f: focal length of an overall optical system of the imaging lens, and
ih: maximum image height.

3. The imaging lens according to claim 1, wherein a conditional expression (3) below is satisfied:

$$2.20<|r1/r2|<8.20 \quad (3)$$

where
r1: curvature radius of the object-side surface of the first lens, and r2: curvature radius of the image-side surface of the first lens.

4. The imaging lens according to claim 1, wherein a conditional expression (4) below is satisfied:

$$-1.50<f2/f<-1.00 \quad (4)$$

where
f: focal length of an overall optical system of the imaging lens, and
f2: focal length of the second lens.

5. The imaging lens according to claim 1, wherein a conditional expression (5) below is satisfied:

$$0.70<f3/f<1.50 \quad (5)$$

where
f: focal length of an overall optical system of the imaging lens, and
f3: focal length of the third lens.

6. The imaging lens according to claim 1, wherein the aspheric surfaces of the fourth lens have a pole-change point in a position off the optical axis.

7. The imaging lens according to claim 1, wherein the aspheric surfaces of the fifth lens have a pole-change point in a position off the optical axis.

8. The imaging lens according to claim 1, wherein a conditional expression (6) below is satisfied:

$$0.6<TTL/2ih<1.0 \quad (6)$$

where
TTL: distance on the optical axis from the aperture stop to an image plane without a filter, and
ih: maximum image height.

9. The imaging lens according to claim 2, wherein a conditional expression (4) below is satisfied:

$$-1.50<f2/f<-1.00 \quad (4)$$

where
f2: focal length of the second lens.

10. The imaging lens according to claim 2, wherein a conditional expression (5) below is satisfied:

$$0.70<f3/f<1.50 \quad (5)$$

where
f3: focal length of the third lens.

11. The imaging lens according to claim 2, wherein the aspheric surfaces of the fourth lens have a pole-change point in a position off the optical axis.

12. The imaging lens according to claim 2, wherein the aspheric surfaces of the fifth lens have a pole-change point in a position off the optical axis.

13. The imaging lens according to claim 2,
wherein a conditional expression (6) below is satisfied:

$$0.6 < TTL/2ih < 1.0 \qquad (6)$$

where
TTL: distance on the optical axis from the aperture stop to an image plane without a filter, and
ih: maximum image height.

14. An imaging lens for a solid-state image sensor in which elements are arranged in order from an object side to an image side, comprising:
   a first lens with positive refractive power having a convex surface on the object side;
   a second lens having a convex surface on the object side;
   a third lens;
   a fourth lens as a double-sided aspheric lens having a concave surface on the image side near an optical axis; and
   a fifth lens as a double-sided aspheric lens having a concave surface on the image side near the optical axis,
   wherein a conditional expression (2) below is satisfied:

$$0.9 < ih/f < 1.1 \qquad (2)$$

where
   f: focal length of an overall optical system of the imaging lens, and
   ih: maximum image height.

15. The imaging lens according to claim 14,
wherein a conditional expression (1) below is satisfied:

$$|r1| > |r2| \qquad (1)$$

where
   r1: curvature radius of the object-side surface of the first lens, and
   r2: curvature radius of the image-side surface of the first lens.

16. The imaging lens according to claim 14,
wherein conditional expressions (4) and (5) below are satisfied:

$$-1.50 < f2/f < -1.00 \qquad (4)$$

$$0.70 < f3/f < 1.50 \qquad (5)$$

where
   f: focal length of an overall optical system of the imaging lens,
   f2: focal length of the second lens, and
   f3: focal length of the third lens.

17. The imaging lens according to claim 14,
wherein the third lens with positive refractive power has a convex surface on the image side, and the fourth lens is a meniscus lens having a concave surface on the image side near the optical axis, and having a pole-change point in a position off the optical axis on the aspheric surfaces of the fourth lens.

18. The imaging lens according to claim 14,
wherein the fifth lens is a meniscus lens having a concave surface on the image side near the optical axis, and having a pole-change point in a position off the optical axis on the aspheric surfaces of the fifth lens.

19. An imaging lens for a solid-state image sensor in which elements are arranged in order from an object side to an image side, comprising:
   an aperture stop;
   a first lens with positive refractive power having a convex surface on the object side;
   a second lens having a convex surface on the object side;
   a third lens;
   a fourth lens as a double-sided aspheric lens with positive refractive power having a concave surface on the image side near an optical axis; and
   a fifth lens as a double-sided aspheric lens having a concave surface on the image side near the optical axis,
   wherein the fourth lens has a weaker refractive power than the first lens, the second lens, the third lens, and the fifth lens.

20. The imaging lens according to claim 1, wherein conditional expressions (2) and (6) below are satisfied:

$$0.9 < ih/f < 1.1 \qquad (2)$$

$$0.6 < TTL/2ih < 1.0 \qquad (6)$$

where
   f: focal length of an overall optical system of the imaging lens,
   TTL: distance on the optical axis from the aperture stop to an image plane without a filter, and
   ih: maximum image height.

* * * * *